(12) United States Patent
Adachi et al.

(10) Patent No.: US 6,215,739 B1
(45) Date of Patent: Apr. 10, 2001

(54) HIGHLY ACCURATE DISC APPARATUS FOR RECORDING/READING INFORMATION IN A DISC MEANS WHERE DISCS ARE CHANGED IN THE APPARATUS WHICH ELIMINATES TRACK ERRORS DUE TO DISC VARIATIONS

(75) Inventors: Kazuteru Adachi; Yasunori Kuwayama, both of Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/092,432

(22) Filed: Jun. 5, 1998

(30) Foreign Application Priority Data

Jun. 17, 1997 (JP) .................................................. 9-159392

(51) Int. Cl.$^7$ ....................................................... G11B 7/00
(52) U.S. Cl. ..................................... 369/44.28; 369/53.29
(58) Field of Search ............................. 369/44.26, 44.27, 369/44.28, 44.32, 54, 58, 44.11, 44.25, 53, 124.02; 360/78.04

(56) References Cited

U.S. PATENT DOCUMENTS

| | | | |
|---|---|---|---|
| 4,773,052 | * | 9/1988 | Sugiura et al. ............... 369/44.27 X |
| 5,047,999 | * | 9/1991 | Van Der Meulen ............... 369/58 X |
| 5,065,383 | * | 11/1991 | Tateishi et al. .................. 369/44.28 |
| 5,675,560 | * | 10/1997 | Ogino ............................ 369/44.28 X |

* cited by examiner

Primary Examiner—Paul W. Huber
(74) Attorney, Agent, or Firm—Lackenbach Siegel

(57) ABSTRACT

A disc apparatus includes a micro-computer. The micro-computer causes a pickup to move to a predetermined position. A track pitch is calculated from a distance over which the pickup has moved and a number of tracks detected during the movement thereof over that distance. In response to a track jump command, tracks to be jumped over are determined in number by the distance from a center of a disc to a current position, a distance from the center of the disc to a target position, and a track pitch measured.

17 Claims, 6 Drawing Sheets

F I G. 2
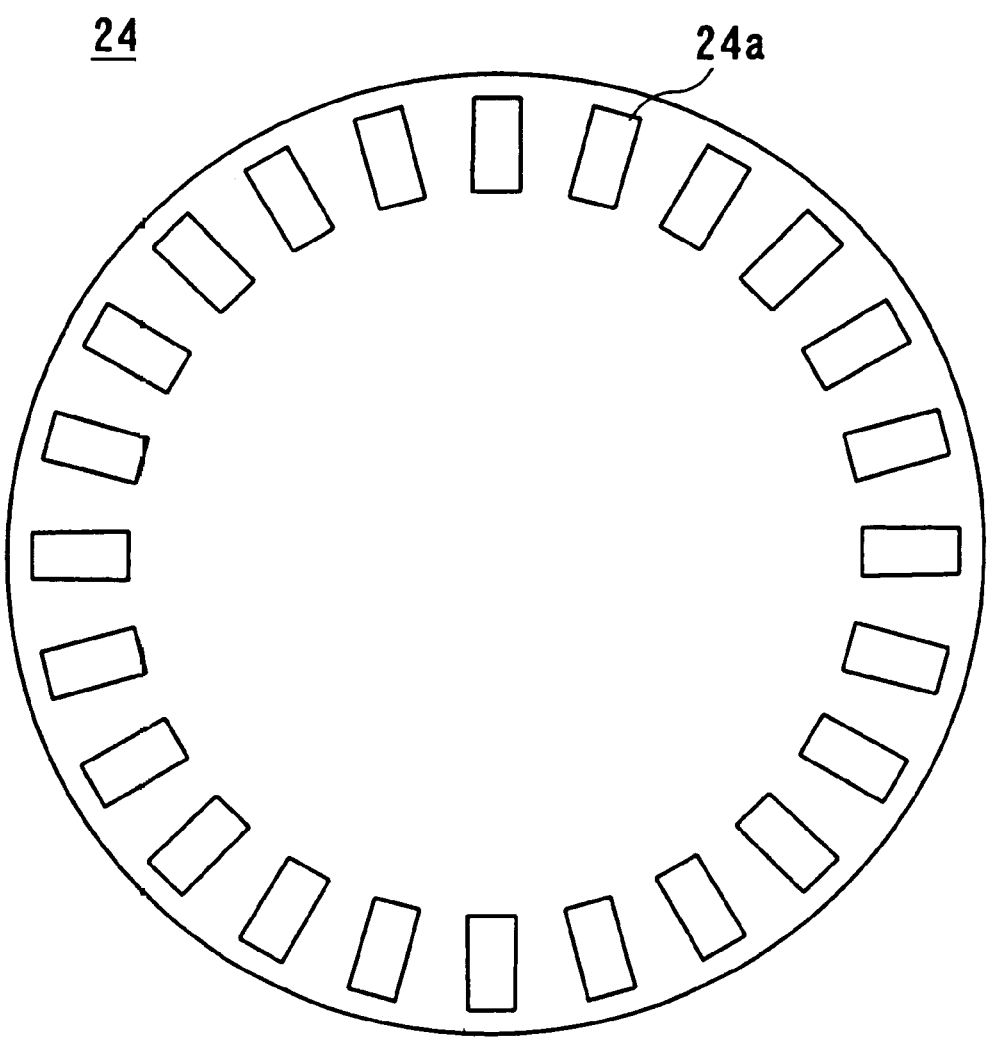

HIGHLY ACCURATE DISC APPARATUS FOR RECORDING/READING INFORMATION IN A DISC MEANS WHERE DISCS ARE CHANGED IN THE APPARATUS WHICH ELIMINATES TRACK ERRORS DUE TO DISC VARIATIONS

BACKGROUND OF THE INVENTION

1. Field of the Invention

This invention relates to disc apparatuses, and more particularly to a disc apparatus adapted to correct a track jump error due to individual disc variation.

2. Description of the Prior Art

In a conventional disc apparatus of this kind, when performing a track jump (seek) to a target position, tracks to be jumped over is first determined in number by calculation and a jump is then effected according to the determined number of tracks. As a result of the jump, when a pickup goes beyond the target position (overshoot) or does not reach the target position (undershoot), the disc is judged as one that is liable to overshoot or undershoot. When a track jump is later performed with the same disc, a correcting value for the overshoot or undershoot, i.e. a value ($\alpha$) taking a disc-manufacturing variation into consideration, is added to or subtracted from the calculated number of tracks, thereby obtaining an accurate seek to a target position.

In the prior art, however, the result of the track jump first made is utilized to compensate for the number of tracks to be jumped later. Accordingly, it has been difficult for a pickup to accurately access to a target position in a track jump immediately after a disc is mounted for the first time on the apparatus. That is, it is a conventional practice to add or subtract a predetermined value ($\alpha$) to or from the number of tracks to be jumped over, without examining factors encountered in overshoot or undershoot.

SUMMARY OF THE INVENTION

Therefore, it is a primary object of this invention to provide a novel disc apparatus.

It is another object of this invention to provide a disc apparatus which can accurately seek a target position by absorbing variation on a disc-by-disc basis.

A disc apparatus according to this invention, adapted to record information on a disc or reads information out of the disc by using a pickup, comprises: a measuring means for measuring a track pitch; and a determining means for determining, in response to a jump command, a first number of tracks to be jumped over by the pickup based on the track pitch.

First, TOC information is read out. This TOC information enables a determination of whether or not the disc was replaced with another disc. Where the disc was changed, a track pitch is measured. That is, the pickup is moved from a current position to a position of 10 min. (predetermined position). A number of tracks to be jumped at this time is calculated on an assumption that the track pitch is at 1.6 $\mu$m. A track pitch (h) for the disc is measured based on a distance over which the pickup has moved and the number of tracks (tracking error signals) detected during the movement over that distance. That is, the track pitch is calculated on a disc-by-disc basis.

If a command is given to perform a track jump to a target position, tracks to be jumped is determined in number by a distance (r1) from a center of the disc to a current position, a distance (r2) from the disc center to a target position, and the measured track pitch (h). The number of tracks jumped is determined using this track pitch (h), by a time the disc is replaced with another disc.

When the disc is changed, the track pitch data (h) for the disc having been mounted so far is erased and a track pitch for a newly mounted disc is again measured. The determination if the disc is changed or not is made by whether or not TOC information read out agrees with the TOC information stored in the memory.

According to this invention, the track pitch is measured disc by disc, and the number of tracks to be jumped is determined based on the measured track pitch. This realizes a high-speed and accurate track jump (seek).

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a light shielding plate in the FIG. 1 embodiment;

DETAILED DESCRIPTION OF THE PREFERRED EMBODIMENTS

Figure 1:
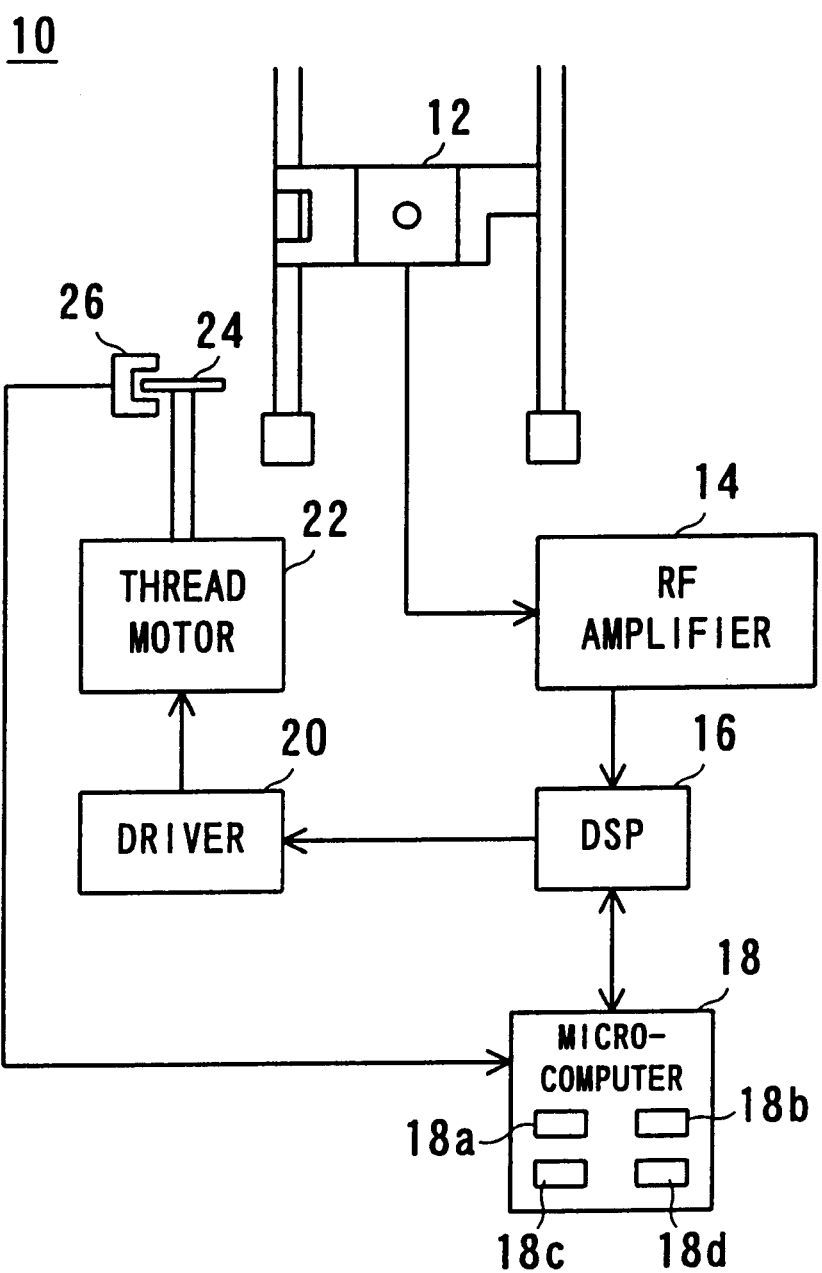
FIG. 1 is an illustrative view showing one embodiment of this invention.
Figure 3:
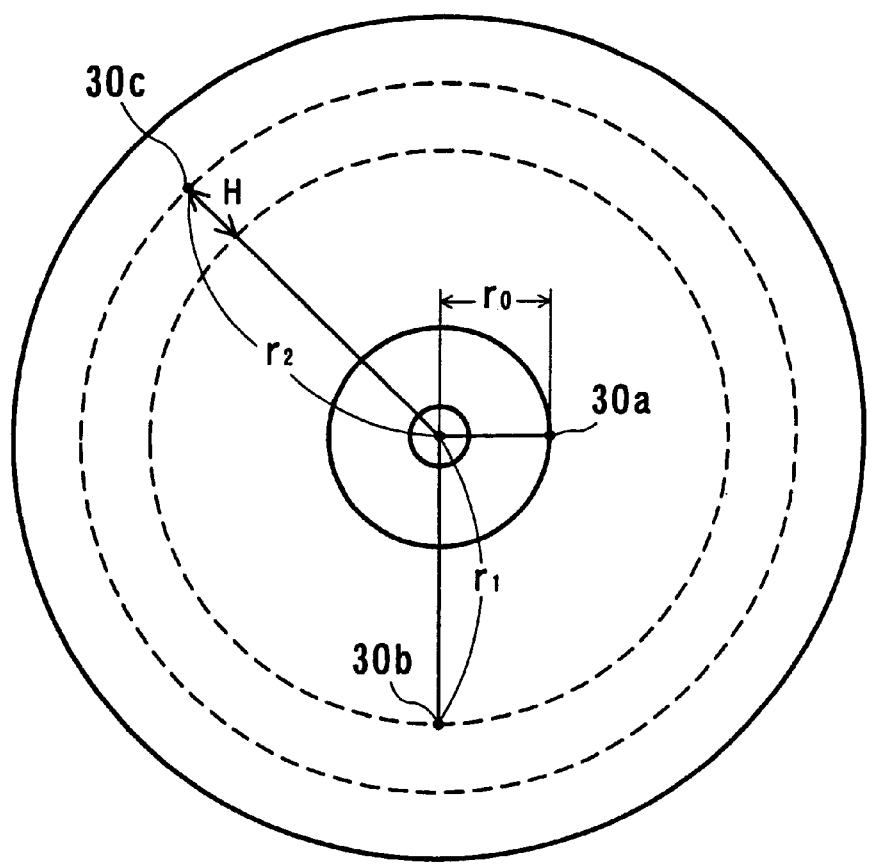
FIG. 3 is an illustrative view showing a current position and a target position on a disc.

Referring to FIG. 1, a disc apparatus in this embodiment includes an optical pickup 12. This optical pickup 12 reads out a reproduction signal which is then supplied to an RF amplifier 14. The pickup 12 also detects a deviation in position of laser beam with respect to a center of a track.

The RF amplifier 14 performs processing, such as amplification, of the read reproduction signal and the tracking error signal. The reproduction signal thus amplified is thereafter wave-shaped, modulated and error-corrected by a DSP (Digital Signal Processor) 16. The reproduction signal and the tracking signal processed is supplied to a micro-computer 18. The micro-computer 18 detects a number of tracks based on the detected tracking error signal. This number of tracks is counted by a counter 18a provided in the micro-computer 18. The DSP 16 also generates a jump pulse to drive a thread motor 22 according to a command supplied from the micro-computer 18.

A driver 20 creates a driving voltage to drive the thread motor 22, depending upon the jump pulse supplied from the DSP 16. Due to this drive voltage, the thread motor 22 is driven to thereby move, in a thread direction, the optical pickup 12 coupled through a rack-and-pinion thereto. Meanwhile, the thread motor 22 has a light shielding plate 24 at a tip of its motor shaft. This light shielding plate 24 is formed with a plurality of slits 24a that are continuous at an equal interval in a circumferential direction, as shown in FIG. 2.

A sensor 26 is provided in the vicinity of the light shielding plate 24. The sensor 26 includes a light emitting section to emit an infrared light used to detect a slit 24a and a light receiving portion arranged opposite to the light emitting section so as to receive the infrared light therefrom. The sensor 26 is arranged so that the slit 24a can be passed between the light emitting and light receiving portions, whereby a slit 24a is detected by receiving an infrared light emitted from the light emitting section by the light receiving section. When the sensor 26 detects a slit 24a, the counter 18b provided in the micro-computer 18 is incremented in its count value. That is, the counter 18b counts a number of slits 24a. In this embodiment, when the count value of the counter 18b reaches "15", the pickup 12 moves by 1 (mm) in a thread direction. Thus, the distance over which the pickup 12 has moved is obtained by the count value of the counter 18b.

The micro-computer 18 measures a track pitch for a disc from a distance that the pickup 12 has moved, a number of tracking error signals detected during movement over the distance, i.e. the number of tracks passed over. Based on the track pitch thus measured, a number of tracks to be jumped over is then determined.

That is, the micro-computer 18 reads out TOC information recorded on the disc 30, and stores the same information, as required, to a memory 18d. Subsequently, the pickup 12 is moved (track-jumped) from a current position to a predetermined target position (e.g. a position of 10 min in time information). Incidentally, the number of tracks to be jumped is calculated on an assumption that a track pitch is at 1.6 ($\mu$m). As stated above, the moving distance of the pickup 12 is detected by a count of the slit 24a, and the number of tracks crossed during the movement over that distance is detected by a number of the tracking error signals. The track pitch h of the disc 30 can be calculated from Equation (1), using the moving distance of the pickup 12 and the number of tracks detected during the movement of the pickup.

$$h = \text{(moving distance)}/\text{(number of tracks)} \quad (1)$$

The data of the track pitch (track pitch data) thus calculated is stored in a memory 18c and held therein until the disc 30 is replaced with another disc. Incidentally, when changing the disc 30, if the read TOC information is different from the TOC information stored in the memory 18d, the disc 30 was changed is determined. The TOC information recorded in the memory 18d (the TOC information of the disc 30 mounted so far) is erased and TOC information of an replaced new disc 30 is recorded thereto.

If a command of a track jump (seek) is given during the reproduction from the disc 30, the micro-computer 18 monitors on the time information (absolute time) contained in a sub-code and calculates a number of frames contained in one track based on the same time information, i.e. the time information (A-time) as to a current position and a linear velocity on the disc 30. That is, the sub-code is added with time information, error-detecting detecting code CRCC, etc. The time t1 (second) required to trace from a head of the recorded data (at an innermost periphery) to the current position can be expressed by Equation (2), based on a cumulative (absolute) time (A1 minutes, B1 seconds, C1 frames) contained in the time information. Incidentally, 1 second corresponds to 75 frames.

$$t1 = 60A1 + B1 + \frac{C1}{75} \quad (2)$$

On the other hand, assuming that the distance between a center of the disc 30 and a head of the recorded data (in a most periphery) 30a is r0(=0.025 m) and the distance between the disc 30 center and a pickup 12 current position 30b is r1, Equation (3) is given as $$\pi(r1^2 - r0^2) = vht1 \quad (3)$$

v; linear velocity (m/sec)

h; track pitch calculated ($\mu$m)

According to Equation (2) and Equation (3), a distance r1 from the center of the disc 30 to a current position 30b can be expressed as Equation (4). Similarly, a distance r2 from the center of the disc 30 to a target position 30c can be determined from the below Equation (5), using an absolute time (A2 minutes, B3 seconds, C2 frames) at that time.

$$r1 = \sqrt{\left[vh\left\{60A1 + B1 + \frac{C1}{75}\right\} \div \pi + r0^2\right]} \quad (4)$$

$$r1 = \sqrt{\left[vh\left\{60A2 + B2 + \frac{C2}{75}\right\} \div \pi + r0^2\right]} \quad (5)$$

Accordingly, a jump distance H is expressed as Equation (6), and the number of tracks to be jumped is readily calculated by Equation (7).

$$H = r2 - r1 \quad (6)$$

$$\text{(number of tracks to be jumped)} = H/h \quad (7)$$

Based on a number of tracks calculated by Equation (7), the DSP 16 supplies the jump pulse to the driver 20 so that driver 20 drives the thread motor 22 to effect a track jump.

Figure 4:
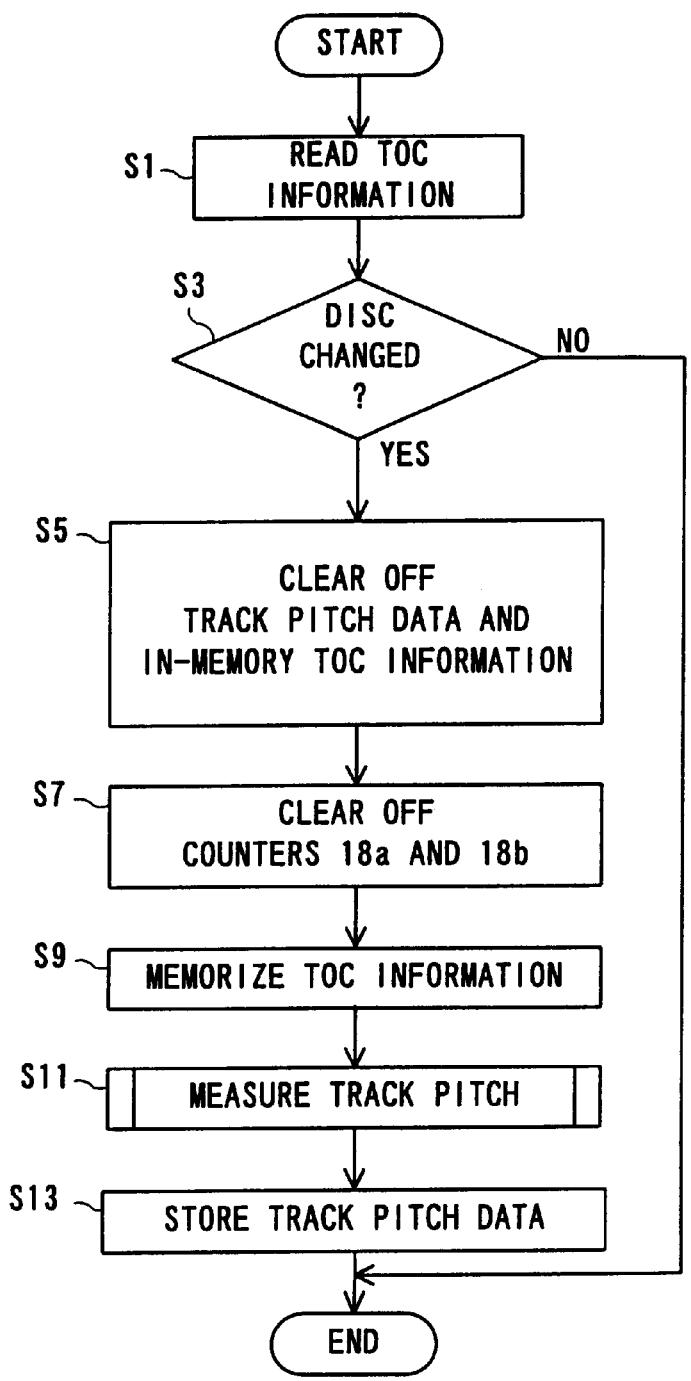
FIG. 4 is a flowchart showing part of operation in the FIG. 1 embodiment.
Figure 5:
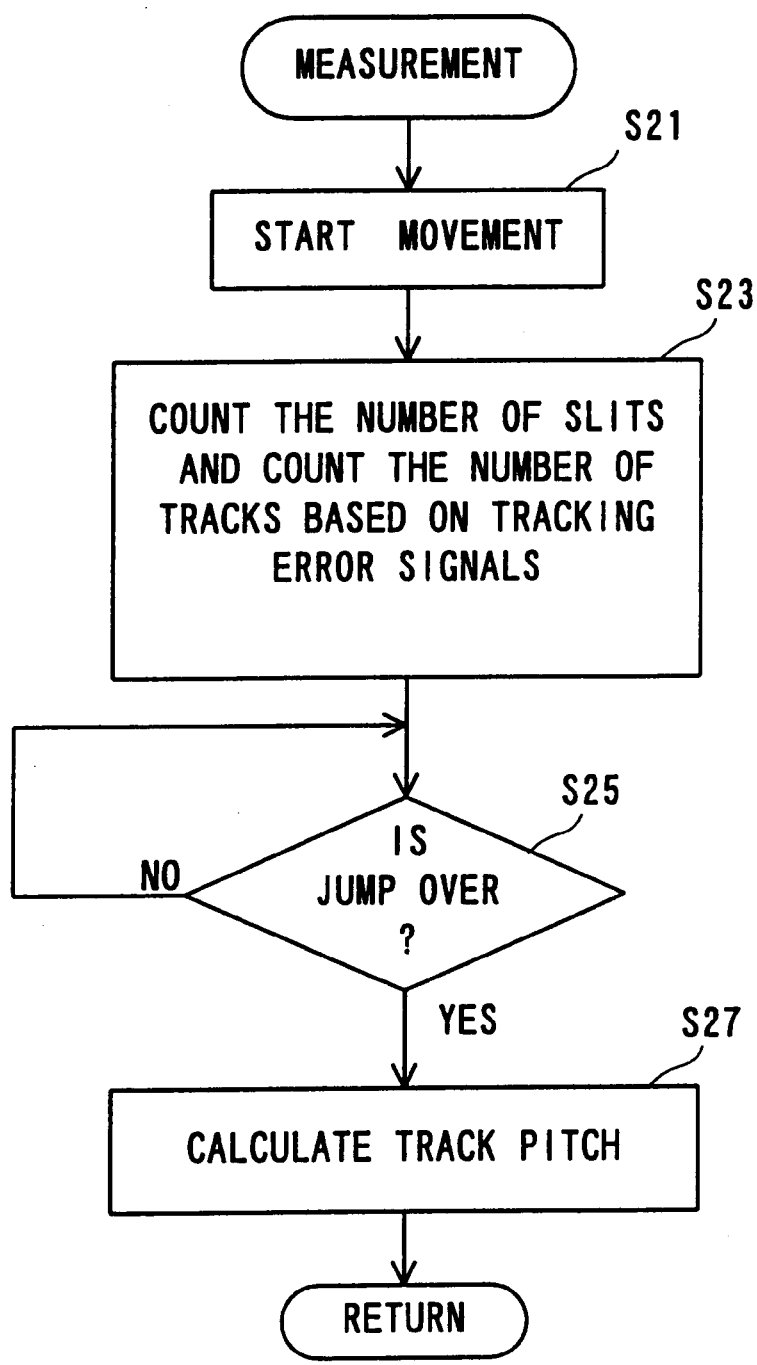
FIG. 5 is a flowchart showing one example of operation in a track-pitch measurement.
Figure 6:
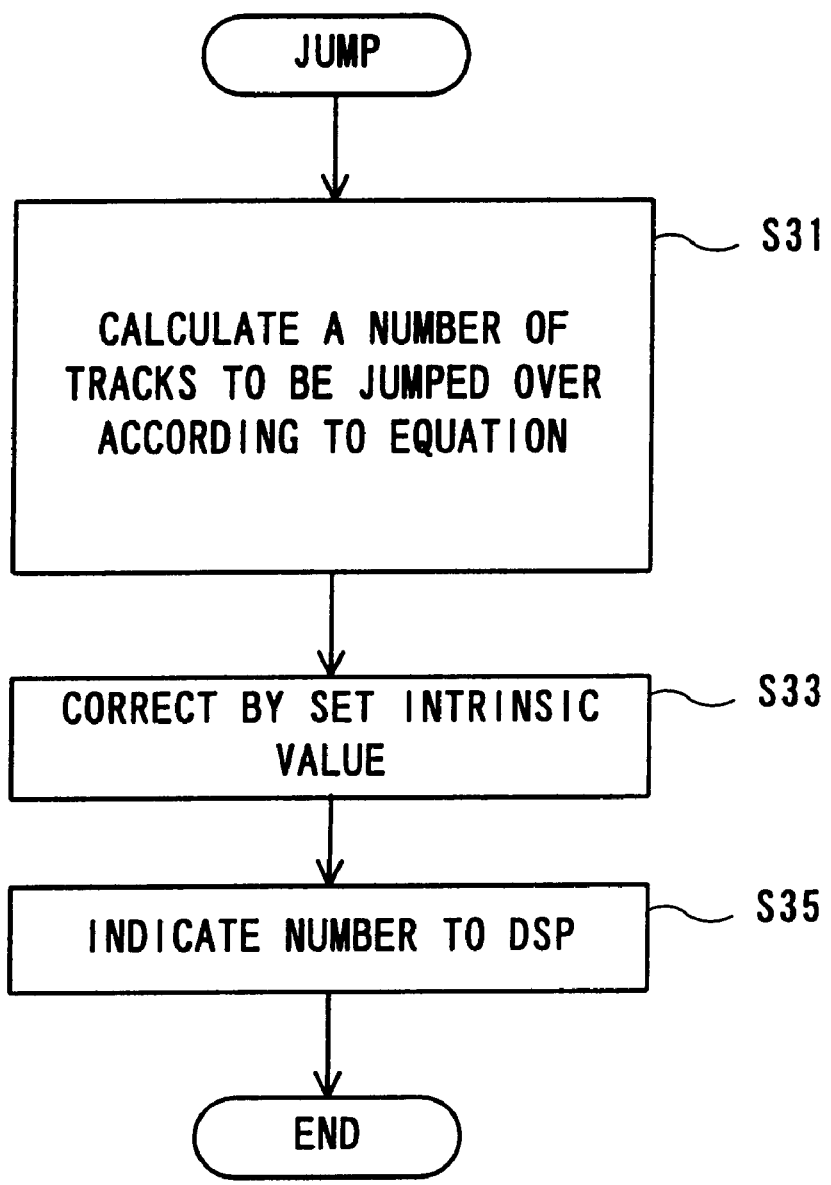
FIG. 6 is a flowchart showing one example of operation of a track jump.

The above-stated operations are carried out according to flowcharts as shown in FIG. 4 through FIG. 6. That is, if a main power of the disc apparatus 10 is turned on, the micro-computer 18 reads, at a step S1, TOC information, and determines, at a step S3, whether the disc is changed, that is, whether the TOC information in the memory 18d agrees with the read TOC information or not. If "NO" in these steps, the process is ended. However, if the determination is "YES", the track pitch data (h) and the TOC information recorded in the respective memories 18c and 18d are cleared off at a step S5, and the counters 18a and 18b are initialized in their count value at a step S7. The read TOC information is stored into the memory 18d at a step S9, and then the track pitch h is measured at a next step S11 according to a flowchart shown in FIG. 5 stated later. At a step S13, the track pitch data measured by the step S11 is stored into the memory 18c, thus ending the process.

When a track pitch measurement is started, the pickup 12 is moved in the thread direction at a step S21 in FIG. 5. At a step S23, the number of slit detected by the sensor 26 is counted up, and the number of tracks is counted up based on the tracking error signals obtained from the pickup 12. That is, detection is made for a moving distance of the pickup 12 as well as a number of tracks detected during the movement over that distance. It is determined at a step S25 whether the jump is over or not. If "NO", the process of the step S25 is repeated, while if "YES", a track pitch h is calculated according to Equation (1) at a step S27.

After measuring the track pitch h, a track jump is effected according to the flowchart shown in FIG. 6. If a command of a seek (track jump) is given by key inputting or the like, the number of tracks to be jumped over is calculated, at a step S31, according to Equation (2) to Equation (7). At a next step S33, the number of tracks calculated by a step S31 is corrected by a value (intrinsic value) in which an intrinsic deviation to the disc apparatus 10 is taken into consideration. At a next step S35, the number of tracks obtained by the step S33 is indicated to the DSP 16 to thereby effect a movement or track jump of the pickup 12.

In this embodiment, a track pitch is measured immediately after mounting (changing) a disc so that a number of tracks to be jumped over is determined by using the track pitch. Thus, high speed and an accurate seek or track jump to a target position is realized.

Incidentally, the set intrinsic value as mentioned in the step S33 refers to variation in the thread motor 22 used for driving the pickup 12 or the like. Measurement is made on each disc apparatus 10 before shipping. Since a value (correcting value) in which the variation is taken into consideration is added to (or subtracted from) the number of tracks calculated at the step S31, the variation in the apparatus itself, besides the variation in the disc 30, is absorbed, thus realizing track jumps with greater accuracy.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc apparatus of greater accuracy for use in recording information on a disc or reading information out of said disc by using a pickup where discs are changed in said disc apparatus which lends to track jump error(s) due to variations between any two devices, comprising:

moving means for actually moving said pickup in a direction of a tread: track detecting means for detecting a number of tracks passed over by said pickup while being actually moved;

calculating means for calculating a track pitch by dividing a distance that said pickup is actually moved due to said moving means by said number of tracks passed over by said track detecting means; and determining means for determining the number of tracks to be jumped over by said pickup based on said calculated track pitch; whereby an accurate seek to a target position is attained.

2. A disc apparatus according to claim 1, wherein said determining means determines a first distance from a center of said disc, a second distance from the center of said disc to a target position, and a first number of tracks based on the track pitch.

3. A disc apparatus according to claim 2, further comprising a determining means for determining whether said disc is changed or not, wherein said measuring means measures the track pitch when said disc is changed.

4. A disc apparatus according to claim 1, further comprising a determining means for determining whether said disc is changed or not, wherein said measuring means measures the track pitch when said disc is changed.

5. A disc apparatus according to claim 1, wherein said disc possesses an intrinsic information area, and said determining means including a means for reading intrinsic information out of the intrinsic information area.

6. A disc apparatus according to claim 1, further including a light shielding plate provided on a motor shaft of a tread motor and having a plurality of slits, and a sensor for detecting the slits when said light shielding plate is in rotation, wherein said track detecting means includes a count means to count the number of said slits and said moving means causing said thread motor to rotate until a count value of said count means reaches a predetermined number, thereby moving said pickup a predetermined distance.

7. A disc apparatus according to claim 6, wherein said determining means determines a first distance from a center of said disc, a second distance from the center of said disc to a target position, and a first number of tracks based on the track pitch.

8. A disc apparatus according to claim 7, further comprising a determining means for determining whether said disc is changed or not, wherein said measuring means measures the track pitch when said disc is changed.

9. A disc apparatus according to claim 6, further comprising a determining means for determining whether said disc is changed or not, wherein said measuring means measures the track pitch when said disc is changed.

10. The disc apparatus according to claim 1, wherein said pickup is an optical pickup and, said moving means is a thread motor.

11. The disc apparatus according to claim 10, further including a light shielding plate, having a plurality of equally spaced apertures about the periphery thereof, mounted on a motor shaft of said motor, and a sensor having oppositely disposed light emitting and light receiving portions for detecting emitted light passing through said apertures when said plate is rotated by said motor; and a counter provided in a micro-computer; and said track detecting means counting said apertures passing between said light emitting and light receiving portions, whereby said motor is caused to rotate an angle which is a function of the number or count of the apertures passing across said sensor.

12. A method for controlling a disc apparatus for recording information on a disc or reading information out of said disc by a pickup, comprising the steps of:

(a) actually moving a pickup in a direction of a tread;

(b) detecting the number of tracks passed over by actual movement of said pickup in step (a);

(c) calculating a track pitch by dividing a distance that said pickup is actually moved by the number of tracks; and (d) determining the number of tracks to be jumped over based on said calculated pitch.

13. A method according to claim 12, wherein the step (a) includes (a1) moving said pickup by a predetermined distance, (a2) counting a second number of tracks crossed over during the movement of said pickup, and (a3) calculating a track pitch from the predetermined distance and the second number of tracks.

14. A method according to claim 13, further comprising a step of determining whether said disc is changed or not, wherein the step (a) is effected when said disc is changed.

15. A method according to claim 12, wherein the step (b) determines a first distance from a center of said disc to a current position, a second distance from the center of said disc to a target position, and the first number of tracks based on the track pitch.

16. A method according to claim 15, further comprising a step of determining whether said disc is changed or not, wherein the step (a) is effected when said disc is changed.

17. A method according to claim 12, further comprising a step of determining whether said disc is changed or not, wherein the step (a) is effected when said disc is changed.

* * * * *